A. PLAGMAN.
PROPELLING MECHANISM FOR VEHICLES.
APPLICATION FILED MAY 16, 1912.
1,053,867.
Patented Feb. 18, 1913.
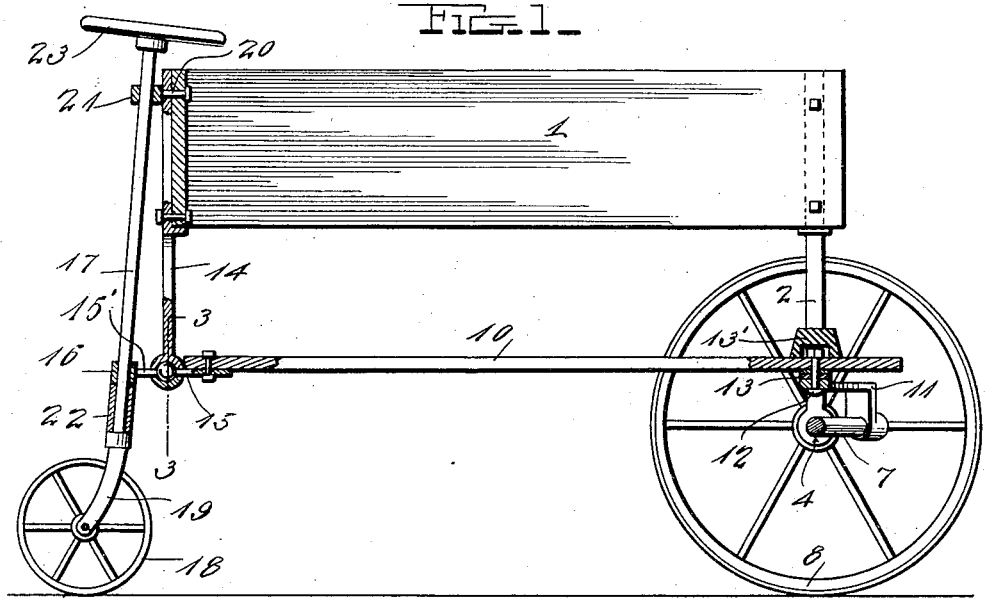
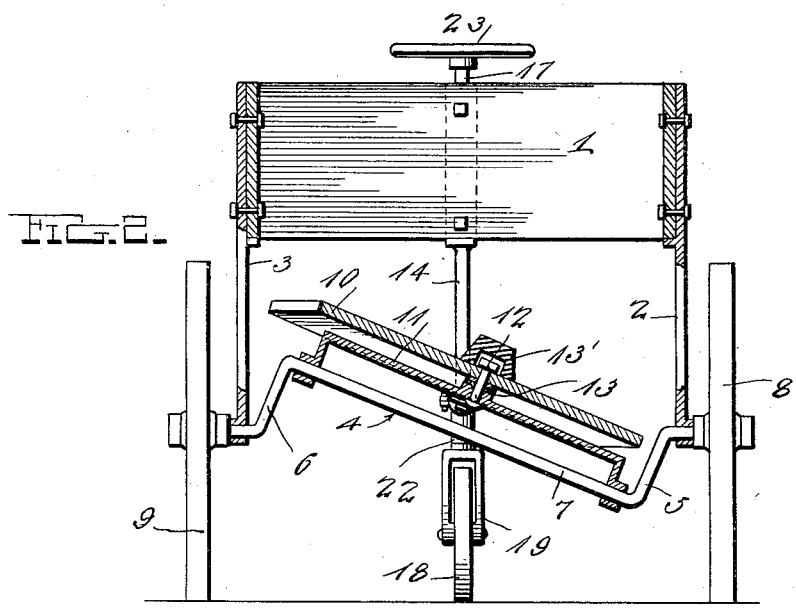
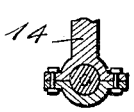
Witnesses
J. P. Pierce
S. M. McColl
Inventor
A. Plagman
by H. B. Willson & Co.
Attorneys

UNITED STATES PATENT OFFICE.

ADOLPH PLAGMAN, OF DAVENPORT, IOWA.

PROPELLING MECHANISM FOR VEHICLES.

1,053,867. Specification of Letters Patent. Patented Feb. 18, 1913.

Application filed May 16, 1912. Serial No. 697,809.

*To all whom it may concern:*

Be it known that I, ADOLPH PLAGMAN, a citizen of the United States, residing at Davenport, in the county of Scott and State of Iowa, have invented certain new and useful Improvements in Propelling Mechanism for Vehicles; and I do declare the following to be a full, clear, and exact description of the invention, such as will enable others skilled in the art to which it appertains to make and use the same.

This invention relates to propelling mechanism for vehicles and more particularly to boys' wagons.

The object of the invention is to provide a simply constructed vehicle which may be propelled by oscillating the bottom of the bed thereof.

Another object is to provide a wagon of this class which will accommodate several boys all of whom may assist in propelling it.

Another object is to provide a wagon of this class mounted on three wheels two of which are fastened to a peculiarly constructed crank shaft and serve as propellers while the third is mounted at the center of the front of the wagon and is designed for use as a steering wheel.

With these and other objects in view the invention comprises certain novel constructions, combinations and arrangements of parts, as will be hereinafter more fully described and claimed.

In the accompanying drawings Figure 1 represents a longitudinal vertical section through the vehicle. Fig. 2 is a transverse vertical section thereof. Fig. 3 is a detail sectional view on line 3—3 of Fig. 1.

In the embodiment illustrated a wagon body 1 is shown of the usual rectangular shape having uprights or standards 2 secured to the rear end of the side members of the body preferably on their outer faces and depending some distance below the lower edges thereof. Mounted in the free lower ends of these standards 2 and 3 is a crank shaft or axle 4 of peculiar configuration having one end 5 bent laterally at right angles in one direction and the other end 6 at right angles in the opposite direction. The terminals of these axle ends 5 and 6 extend outwardly in planes parallel with the body portion 7 of the axle and these straight terminals extend through the standards 2 and 3 and have the rear driving wheels 8 and 9 mounted thereon. The body portion 7 of the axle is of a length substantially the same as the width of the wagon bottom 10 which is mounted on said body portion 7 preferably by means of a metal bar or bolster 11 which is mounted on the lower face of the rear end of said bottom 10 by a bolt 12 which extends through said bar midway the length thereof and through said bottom 10 being secured by any suitable means and preferably having spacing washers 13 arranged thereon between the inner face of the bar and the lower face of the bottom 10. A bumper 13′, is preferably mounted over the upper end of the bolt on the upper face of the bottom 10 for engagement by the feet of the operator. The free ends of this bolster 11 are bent downwardly at right angles and apertured to receive the axle portion 7. A third standard 14 is secured to the front end of the wagon body and depends below its lower edge a distance corresponding to the standards 2 and 3 it being the same length as said standards 2 and 3 and disposed midway the length of the front end of the wagon body.

A rod 15 has a ball and socket connection with the lower end of the standard 14 and is secured to the bottom 10 forming a pivotal support for the front end of said bottom. A rod 15′ extends forwardly from the socket member on the lower end of the standard 14 and has an eye 16 on its outer end through which a steering rod 17 passes. A wheel 18 is mounted on the lower end of this rod 17 preferably by means of a fork 19 similar to the fork of a bicycle front wheel. A rod 20 extends laterally from the upper end of the standard 14 and has an eye 21 on its outer end through which the steering rod 17 also passes. A ferrule or sleeve 22 on the fork 19 receives and is secured to the rod 17 and on the upper end of which the eye 16 of the rod 15 rests and serves to hold the front of the wagon body in proper position. A steering wheel 23 is mounted on the upper end of the rod 17 in convenient position for manipulation by the boy at the front of the wagon.

It will thus be obvious that the oscillation of the bottom 10, which is manipulated by the feet of the occupants, will turn the crank shaft and through the rear wheels fixed thereon propel the vehicle.

While the invention is shown and described as applied to a boy's wagon it will be evident that it may be applied to other forms of vehicle.

Various changes in the form, proportion and the minor details of construction may be resorted to without departing from the principle or sacrificing any of the advantages of the invention as defined in the appended claims.

I claim as my invention—

1. The combination with a vehicle body, of a crank axle having wheels fixed to the ends thereof and provided with a crank intermediate of said ends, a bottom loosely mounted on the crank portion of said axle and oscillatable to turn the axle and thereby propel the vehicle.

2. The combination with a vehicle provided with front and side members having standards depending therefrom, of a crank axle rotatably mounted in two of said standards and having propelling wheels fixed thereto, a steering wheel mounted on the other standard, and an oscillatable bottom mounted on the crank portion of said axle.

3. The combination of a vehicle body having an oscillatable bottom disposed in a plane below the side and end members of said body, standards depending from the side members of said body, a crank axle having a main or body portion with which said bottom is loosely connected and by which the bottom is supported, the ends of said axle being bent laterally at right angles in opposite directions and having their terminals extending in planes parallel with the main portion thereof, said terminals extending through said standards, wheels fixed to said terminals, and a steering wheel at the front of the body for steering and supporting it.

In testimony whereof I have hereunto set my hand in presence of two subscribing witnesses.

ADOLPH PLAGMAN.

Witnesses:
H. C. WUNDER,
HAROLD HANSEN.

---

Copies of this patent may be obtained for five cents each, by addressing the "Commissioner of Patents, Washington, D. C."